United States Patent
Ohashi

(10) Patent No.: US 6,706,811 B2
(45) Date of Patent: Mar. 16, 2004

(54) METHOD FOR PREPARATION OF AQUEOUS EMULSION OF LONG-CHAIN ALKYL-MODIFIED SILICONE

(75) Inventor: Hiroshi Ohashi, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/158,897

(22) Filed: Jun. 3, 2002

(65) Prior Publication Data

US 2002/0183445 A1 Dec. 5, 2002

(30) Foreign Application Priority Data

Jun. 4, 2001 (JP) .......................... 2001-167903

(51) Int. Cl.[7] .................. C08L 83/05; C08L 83/10; C08G 77/12
(52) U.S. Cl. .................... 524/837; 524/588; 524/861; 524/862; 524/866; 516/53; 516/55; 525/479; 528/15; 528/25; 528/31
(58) Field of Search ............... 524/837, 861, 524/862, 866, 588; 528/15, 25, 31; 525/479; 516/53, 55

(56) References Cited

U.S. PATENT DOCUMENTS

| | | | | |
|---|---|---|---|---|
| 5,074,912 A | * | 12/1991 | Liles et al. ................. 106/2 |
| 5,338,536 A | * | 8/1994 | Thimineur et al. ..... 424/70.121 |
| 5,393,521 A | * | 2/1995 | Lance-Gomez et al. . 424/70.12 |
| 5,401,801 A | * | 3/1995 | Naganawa et al. ......... 524/745 |
| 5,401,870 A | * | 3/1995 | Raleigh et al. ............. 556/445 |
| 5,500,148 A | * | 3/1996 | Ohba et al. .................... 516/76 |
| 5,578,692 A | * | 11/1996 | Biggs et al. .................. 528/15 |
| 6,211,323 B1 | * | 4/2001 | Akinaga et al. .............. 528/15 |
| 6,451,909 B1 | * | 9/2002 | Herzig et al. ................ 524/837 |

OTHER PUBLICATIONS

English Abstract of JP 05-028720 A, Feb. 1993, Yoshiyama.*
English Abstract of JP 05-282104 A, Oct. 1993, Osawa.*

* cited by examiner

Primary Examiner—Jeffrey B. Robertson
(74) Attorney, Agent, or Firm—Millen, White, Zelano & Branigan, P.C.

(57) ABSTRACT

The invention discloses an efficient and convenient method for the preparation of an aqueous emulsion of an organopolysiloxane having long-chain alkyl groups bonded to the silicon atoms. Instead of dispersing and emulsifying an organopolysiloxane modified in advance with long-chain alkyl groups in an aqueous medium, as is the case in the prior art method, an organohydrogenpolysiloxane having silicon-bonded hydrogen atoms and a long-chain α-olefin compound are co-emulsified in an aqueous medium containing a surface active agent and this aqueous emulsion is heated under agitation with addition of a catalytic platinum compound so as to effect the in situ hydrosilation reaction between the silicon-bonded hydrogen atoms in the organohydrogenpolysiloxane and the ethylenically unsaturated bonds in the α-olefin compound. The aqueous emulsion prepared by the inventive method exhibits excellent stability against long-term storage, dilution with water and mechanical shearing force.

11 Claims, No Drawings

METHOD FOR PREPARATION OF AQUEOUS EMULSION OF LONG-CHAIN ALKYL-MODIFIED SILICONE

BACKGROUND OF THE INVENTION

The present invention relates to a convenient and efficient method for the preparation of an aqueous emulsion of a long-chain alkyl-modified silicone, i.e. organopolysiloxane, having excellent stability against long-term storage, dilution with water and mechanical shearing force.

A long-chain alkyl-modified silicone, which is an organopolysiloxane compound having long-chain alkyl groups substituting for at least apart of the organic groups directly bonded to the silicon atoms in the molecular structure and referred to simply as an alkyl-modified silicone hereinafter, is a known compound and is widely employed as a coating agent on various shaped articles of plastic resins or rubbers and as a metal mold releasing agent for molding of resins and rubbers by virtue of the good coating workability as compared with simple dimethyl silicones. It is usual from the standpoint of safety and working efficiency that such an alkyl-modified silicone is used in the form of a solution prepared by dissolving the silicone in an organic solvent (Japanese Patent Publications 45-10056 and 3-11606) or in the form of an aqueous emulsion. Alternatively, silicones can be used in these applications in the form of an aqueous emulsion prepared by dispersing and emulsifying the silicone in an aqueous medium (Japanese Patent Publication 8-2475 and Japanese Patent Kokai 5-287204).

Alkyl-modified silicones are also used as a surface protecting agent and water-repellent agent by virtue of their excellent slipperiness, water repellency and other surface properties (Japanese Patent Kokai 11-92694, 2000-63755 and 2000-239656).

As a consequence of introduction of long-chain alkyl groups substituting on the silicon atoms, however, alkyl-modified silicones are generally less dispersible and emulsifiable in an aqueous medium than dimethyl silicones so that aqueous emulsions of an alkyl-modifled silicone disadvantageously suffer from poor stability against dilution with water and mechanical shearing. With an object to overcome this disadvantage, Japanese Patent Kokai 5-287204 proposes an emulsion composition compounded with an alkyl diphenyl ether disulfonate. The improvement on the stability of the emulsion composition obtained by this formulation, however, is limited and still far from satisfactory.

When the content of long-chain alkyl groups is increased, alkyl-modified silicones are no longer in the form of a liquid but are converted into a solid. Such a solid silicone must be dispersed and emulsified in an aqueous medium for emulsification after melting by heating or in a hot medium. This means that the emulsifiability of such a solid silicone is still poorer than that of liquid silicones adversely affecting, as a trend, the stability of the aqueous emulsion once prepared.

In addition, it is a usual procedure for the preparation of an aqueous emulsion of an alkyl-modified silicone that synthetic preparation of a silicone substituted by long-chain alkyl groups must precede mechanical dispersion and emulsification of the silicone in an aqueous medium necessitating a complicated two-step procedure. When the alkyl-modified silicone is a solid containing a large amount of long-chain alkyl groups, in particular, the process of emulsion preparation therewith involves a further serious problem in the workers' safety because the procedure must include handling of a molten silicone at a high temperature as is mentioned above.

SUMMARY OF THE INVENTION

The present invention accordingly has an object to provide a novel and efficient method for the preparation of an aqueous emulsion of an alkyl-modified silicone having excellent stability against dilution with water and mechanical shearing without the problem of safety even when the content of the long-chain alkyl groups is high in the alkyl-modified silicone.

The unexpected discovery leading to the present invention obtained by the extensive investigations of the inventors is that the above mentioned object of the invention can be accomplished when the synthetic reaction of an alkyl-modified silicone is conducted in situ in an aqueous emulsion of the starting reactants of the alkyl-modified silicone instead of dispersing and emulsifying a ready-prepared alkyl-modified silicone in an aqueous medium.

Thus, the method of the present invention for the preparation of an aqueous emulsion of an alkyl-modified silicone comprises the steps of:

(a) dispersing and emulsifying an organopolysiloxane having hydrogen atoms directly bonded to the silicon atoms, referred to as an organohydrogenpolysiloxane hereinafter, and an α-(long-chain alkyl) olefin compound, referred to simply as an α-olefin compound hereinafter, represented by the general formula $CH_2=CH-C_pH_{2p+1}$, in which the subscript p is a positive integer not smaller than 10, as the starting reactants jointly in an aqueous medium containing a surface active agent to give an aqueous emulsion of the reactants;

(b) adding a catalytically effective amount of a platinum compound to the aqueous emulsion of the reactants; and (c) heating the aqueous emulsion under agitation to an elevated temperature to effect hydrosilation reaction between the silicon-bonded hydrogen atoms in the organohydrogenpolysiloxane and the ethylenically unsaturatied bonds in the α-olefin compound.

DETAILED DESCRIPTION OF THE PREFERRED EMBODIMENTS

As is describer above, the characteristic feature of the inventive method consists in the in situ formation of an alkyl-modified silicone in an aqueous emulsion of the starting reactants by the hydrosilation reaction taking place between the reactants in the emulsion droplets. As a result of this unique procedure, an aqueous emulsion of an alkyl-modified silicone having excellent stability against dilution with water and mechanical shearing can be prepared conveniently without the problem of safety encountered in the prior art methods.

The organohydrogenpolysiloxane as one of the starting reactants of the alkyl-modified silicone is an organopolysiloxane having, in a moledule, at least one hydrogen atom directly bonded to the silicon atom without particular limitations on the molecular structure and molecular weight. It is, however, preferable in respect of good coating workability with the alkyl-modified silicone emulsion as the product of the inventive method that the organohydrogenpolysiloxane has a straightly linear molecular structure represented by the general formula

in which $R^1$ is a monovalent hydrocarbon group having 1 to 6 carbon atoms exemplified by alkyl groups such as methyl, ethyl, propyl and butyl groups, cycloalkyl groups such as cyclohexyl group and aryl groups such as phenyl group, of which methyl group is particularly preferable in respect of good emulsifiability of the silicone, $R^2$ is a hydrogen atom or $R^1$, the subscript m is 0 or a positive integer not exceeding 1000 and the subscript n is 0 or a positive integer not exceeding 1000 with the proviso that, when n is 0, at least one of the two $R^2$ groups in a molecule is a hydrogen atom. Preferably, the subscript m is 0 or a positive integer not exceeding 100 and the subscript n is a positive integer of 5 to 100 with the proviso that the ratio of n:(n+m) is at least 0.25 in consideration of good coating workability and water repellency of the alkyl-modified silicone emulsion as the product.

The α-olefin compound as the other starting reactant is an unsaturated long-chain hydrocarbon compound having a double bond at the molecular chain end without particular limitations in the molecular structure and molecular weight although it is preferable that the number of the carbon atoms in a molecule thereof is at least 12 in respect of the desirable properties of the alkyl-modified silicone emulsion as the reaction product such as coating workability and water repellency.

The compounding proportion of the organohydrogenpolysiloxane and the α-olefin compound to be jointly emulsified in an aqueous medium is, though not particularly limitative, preferably such that from 1.0 to 1.5 moles of the α-olefin compound are provided per mole of the silicon-bonded hydrogen atoms in the organohydrogenpolysiloxane in consideration of the reactivity of these starting reactants in the hydrosilation reaction.

The step (a) of the inventive method is to disperse and emulsify the above described two starting reactants jointly or as a mixture in an aqueous medium containing a surface active agent to form an aqueous emulsion of the starting reactant compounds, referred to as the primary emulsion hereinafter. The surface active agent used here is not particularly limitative provided that the hydrosilation reaction between the reactants is not adversely affected thereby including non-ionic, anionic, cationic and amphoteric surface active agents which can be used either singly or as a combination of two kinds or more, if compatible, although a non-ionic surface active agent having good compatibility is preferable when consideration is made of the ionic nature of other ingredients necessarily or optionally introduced into the aqueous emulsion of the reactants.

Examples of suitable non-ionic surface active agents include ethoxylated higher alcohols, ethoxylated alkylphenols, fatty acid esters of polyhydric alcohols, fatty acid esters of ethoxylated polyhydric alcohols, ethoxylated fatty acids, ethoxylated fatty acid amides, sorbitol, sorbitan fatty acid esters, ethoxylated sorbitan fatty acid esters and sugar fatty acid esters, though not particularly limitative thereto.

Examples of usable anionic surface active agents include higher alcohol sulfuric acid ester salts, alkylphenyl ether sulfuric acid ester salts, alkylbenzene sulfonic acid salts, higher alcohol phosphoric acid ester salts, ethoxylated higher alcohol sulfuric acid ester salts, ethoxylated alkylphenyl ether sulfuric acid ester salts and ethoxylated higher alcohol phosphoric acid ester salts. Examples of usable cationic surface active agents include alkyl trimethylammonium salts, alkyl benzyl dimethylammonium salts and acyl choline chlorides. Examples of usable amphoteric surface active agents include laurylaminopropionic acid and lecithin.

The method for emulsifying a mixture of the above described two starting reactants in an aqueous medium to give the primary emulsion can be conventional without particular limitations. Namely, a mixture of the starting reactants is introduced together with the surface active agent into an aqueous medium and the mixture is agitated by using an emulsifier machine such as homomixers, colloid mills and homogenizers to effect emulsification of the reactant mixture in the aqueous medium containing the surface active agent to give a uniform aqueous emulsion.

In step (b) of the inventive method, the thus obtained primary emulsion is further admixed under agitation with a catalytically effective amount of a platinum compound which serves as a catalyst for promoting the hydrosilation reaction between the silicon-bonded hydrogen atoms in the organohydrogempolysiloxane and the ethylenically unsaturated bonds in the α-olefin compound to effect in situ formation of droplets or particles of an alkyl-modified silicone in the aqueous emulsion. The amount of the catalytic platinum compound is in the range from 1 to 100 ppm by weight, calculated as the platinum element, based on the amount of the organohydrogenpolysiloxane.

Examples of suitable catalytic platinum compounds include chloroplatinic acid and vinylsiloxane/platinum complexes, e.g., 1,3-divinyl-1,1,3,3-tetramethyldisiloxane/platinum complexes, though not particularly limitative thereto. The platinum catalyst is introduced into the aqueous emulsion of the reactant mixture either as an aqueous solution, when the catalyst compound is chloroplatinic acid, or as an aqueous emulsion prepared in advance by self-emulsification of a mixture of a water-insoluble catalyst compound and a surface active agent.

Although the addition reaction of hydrosilation between the starting reactants can proceed, though at a slow rate, even at a temperature lower than 50° C., it is advantageous that the aqueous emulsion as the reaction mixture is heated in step (c) of the inventive method under agitation to improve productivity of the process. The heating temperature is preferably in the range from 50 to 80° C. because, when the temperature is too low, no substantial improvement can be accomplished in the productivity and, when the temperature is too high, the aqueous emulsion may eventually suffer from a decrease in the stability. When the reaction temperature is set in the above mentioned temperature range, the hydrosilation reaction between the reactants is complete usually within 3 to 10 hours. When the reaction is terminated too early, the reaction cannot be complete as a matter of course while no particular additional advantages can be obtained by extending the reaction time to exceed 10 hours.

It is sometimes the case depending on the types of the organohydrogenpolysiloxane that the hydrosilation reaction between the reactants is accompanied by the dehydrogenation reaction of the organohydrogenpolysiloxane as a side reaction which is particularly remarkable as a trend when the content of the silicon-bonded hydrogen atoms is high in the organohydrogenpolysiloxane. The dehydrogenation reaction of the organohydrogenpolysiloxane can be advantageously decreased at least partly when the pH value of the aqueous emulsion medium is decreased to 7.0 or below or 7.0 to 5.0 by the admixture of an acidic compound in an amount of, for example, from 0.01 to 1 part by weight per 100 parts by weight of the organohydrogenpolysiloxane while the pH value of the medium can be up to 8.0 before addition of an acidic compound though depending on the types of the surface active agent.

Examples of the above mentioned acidic compound used for controlling the pH value of the aqueous emulsion medium include inorganic acids such as phosphoric and hydrochloric acids and organic acids such as formic, acetic and lactic acids, of which phosphoric acid is preferable in respect of easiness of handling and high effectiveness even with a relatively small amount of addition. The amount of these acidic compounds added to the aqueous emulsion of the starting reactants to give a sufficient effect can be 0.01 to 1 part by weight per 100 parts by weight of the organohydrogenpolysiloxane.

It is optional that the aqueous emulsion of the alkyl-modified silicone obtained in the above described procedure is, though usable as such, further admixed with various additives including preservatives, rustproof agents, coloring agents and others as well as non-ionic and ionic surface active agents to further improve stability of the emulsion. Other optional additives include water-repellent agents, softening agents, antistatic agents, flame-retardant agents and others in the form of a water-base finishing agent depending on the intended application of the emulsion product.

In the following, particular embodiments of the present invention are described in more detail by way of Examples and Comparative Examples which, however, never limit the scope of the invention in any way. In the Examples and Comparative Examples described below, the respective aqueous silicone emulsions were subjected to the evaluation tests for the following items (1) to (4) by the testing procedures respectively described there.

(1) Average diameter of the emulsion particles or droplets: Measurements were made by using a photon-correlated particle-diameter tester (Model Coulter N4 Plus, manufactured by Beckman-Coulter Co.).

(2) Storage stability: A 100 g portion of the silicone emulsion was taken in a glass bottle and kept standing therein at 25° C. for up to 6 months with periodical visual inspection.

(3) Stability against dilution: Evaluation was made by visual inspection of the surface condition of the silicone emulsion as 50-times diluted with water, of which a 100 g portion was kept standing in a 200 ml glass beaker for 24 hours at 25° C.

(4) Mechanical stability tests-I and -II: Evaluation was made by visual inspection of the surface condition of a 300 g portion of the 50-times diluted silicone emulsion taken in a 500 ml glass beaker after agitation for 1 hour or 2 hours, respectively, with a homomixer rotating at 10000 rpm.

EXAMPLE 1

Into a glass beaker of 500 ml capacity were taken 18.3 g of an organohydrogenpolysiloxane expressed by the structural formula

Me$_3$Si—O—(—SiHMe—O—)$_{50}$—SiMe$_3$, in which Me is a methyl group, 81.7 g of an α-olefin mixture consisting of 57% by weight of hexadecene-1 and 43% by weight of octadecene-1 (Dialene 168, a trade name by Mitsubishi Chemical Co.) and 10.0 g of a non-ionic surface active agent which was a polyoxyethylene tridecyl ether (9 moles of ethylene oxide addition) and they were mixed together by using a homomixer to give a uniform mixture to which 190 g of water were gradually added under agitation to effect emulsification. The thus obtained emulsion was passed once through a homogenizer under a pressure of 30 MPa to give a stable aqueous emulsion of the starting reactants.

In the next place, the thus obtained reactant emulsion was transferred into a glass flask of 500 ml capacity equipped with a stirrer and a thermometer and a mixture of 0.3 g of a 0.5% by weight toluene solution of a divinyl tetramethyl disiloxane/platinum complex and 0.6 g of the same non-ionic surface active agent as used above was added thereto under agitation to effect the hydrosilation reaction taking 5 hours at 70° C. A small portion of the emulsion after the above mentioned reaction time was taken and subjected to determination of the residual silicon-bonded hydrogen atoms in the starting organohydrogenpolysiloxane by alkali decomposition with a 20% aqueous solution of sodium hydroxide not to detect any evolution of hydrogen gas by the alkali decomposition of the silicon-bonded hydrogen atoms so that completion of the hydrosilation reaction could be assumed in the aqueous emulsion of the alkyl-modified silicone, which is referred to as the modified silicone emulsion A hereinafter., The non-volatile matter left after drying of this modified silicone emulsion A at 105° C. for 3 hours was a white solid having a melting point of 37 to 40° C. This solid material was subjected to the analyses by infrared absorption spectrophotometry, nuclear magnetic resonance spectroscopy and gel permeation chromatography and could be identified from the results of these analyses to be expressed by the formula

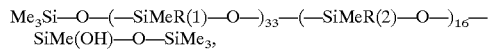

Me$_3$Si—O—(—SiMeR(1)—O—)$_{33}$—(—SiMeR(2)—O—)$_{16}$—SiMe(OH)—O—SiMe$_3$, in which Me is a methyl group, R(1) is a hexadecyl group —C$_{16}$H$_{33}$ and R(2) is an octadecyl group —C$_{18}$H$_{37}$. The results of the evaluation tests for this modified silicone emulsion A included an average particle diameter of 240 nm and good stability in each of the four stability tests undertaken.

EXAMPLE 2

An aqueous emulsion of an alkyl-modified silicone, referred to as the modified silicone emulsion B hereinafter, was prepared in substantially the same manner as in Example 1 except that the amount of the same organohydrogenpolysiloxane as used in Example 1 was decreased from 18.3 g to 13.8 g and 81.7 g of the α-olefin mixture were replaced with 86.2 g of another α-olefin mixture (Dialene 208, a product by Mitsubishi Chemical Co.) consisting of 0.5% of CH$_2$=CH—C$_{16}$H$_{33}$, 27% of CH$_2$=CH—C$_{18}$H$_{37}$, 23% of CH$_2$=CH—C$_{20}$H$_{41}$, 19% of CH$_2$=CH—C$_{22}$H$_{45}$, 15% of CH$_2$=CH—C$_{24}$H$_{49}$, 11% of CH$_2$=CH—C$_{26}$H$_{53}$ and 4.5% of CH$_2$=CH—C$_{28}$H$_{57}$.

The non-volatile matter left after drying of this modified silicone emulsion B at 105° C. for 3 hours was a white solid having a melting point of 54 to 58° C. This solid material was subjected to the analyses by infrared absorption spectrophotometry, nuclear magnetic resonance spectroscopy and gel permeation chromatograph and could be identified from the results of these analyses to be expressed by the formula

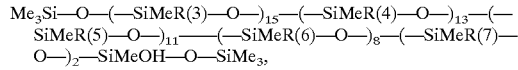

Me$_3$Si—O—(—SiMeR(3)—O—)$_{15}$—(—SiMeR(4)—O—)$_{13}$—(—SiMeR(5)—O—)$_{11}$—(—SiMeR(6)—O—)$_{8}$—(—SiMeR(7)—O—)$_{2}$—SiMeOH—O—SiMe$_3$, in which Me is a methyl group, R(3) is a —C$_{20}$H$_{41}$ group, R(4) is a —C$_{22}$H$_{45}$ group, R(5) is a —C$_{24}$H$_{49}$ group, R(6) is a —C$_{26}$H$_{53}$ group and R(7) is a —C$_{28}$H$_{57}$ group. The results of the evaluation tests for this modified silicone emulsion B included an average particle diameter of 270 nm and good stability in each of the four stability tests.

EXAMPLE 3

An aqueous emulsion of an alkyl-modified silicone, referred to as the modified silicone emulsion C hereinafter, was prepared in substantially the same manner as in Example 1 except that the amount of the same organohydrogenpolysiloxane as used in Example 1 was increased from 18.3 g to 22.6 g and 81.7 g of the α-olefin mixture were replaced with 77.4 g of a third α-olefin mixture (Dialene 124, a product by Mitsubishi Chemical Co.) consisting of 56% of $CH_2=CH-C_{10}H_{21}$ and 44% of $CH_2=CH-C_{12}H_{25}$.

The non-volatile matter left after drying of this modified silicone emulsion C at 105° C. for 3 hours was a slightly white-cloudy liquid. This liquid material was subjected to the analyses by infrared absorption spectrophotometry, nuclear magnetic resonance spectroscopy and gel permeation chromatograph and could be identified from the results of these analyses to be expressed by the formula

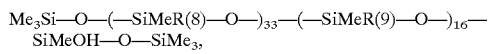

in which Me is a methyl group, R(8) is a $-C_{12}H_{25}$ group and R(9) is a $-C_{14}H_{29}$ group. The results of the evaluation tests for this modified silicone emulsion C included an average droplet diameter of 240 nm and good stability in each of the four stability tests.

EXAMPLE 4

An aqueous emulsion of an alkyl-modified silicone, referred to as the modified silicone emulsion D hereinafter, was prepared in substantially the same manner as in Example 1 except that the organohydrogenpolysiloxane taken in an amount of 37.8 g was expressed by the structural formula

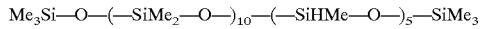

and the α-olefin mixture taken in an amount of 62.1 g was the same mixture as used in Example 2.

The non-volatile matter left after drying of this modified silicone emulsion D at 105° C. for 3 hours was a white solid having a melting point of 37 to 41° C. This solid material was subjected to the analyses by infrared absorption spectrophotometry, nuclear magnetic resonance spectroscopy and gel permeation chromatograph and could be identified from the results of these analyses to be expressed by the formula

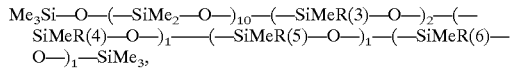

in which Me is a methyl group and (R3) to (R6) each have the same meaning as defined in Example 2. The results of the evaluation tests for this modified silicone emulsion D included an average particle diameter of 250 nm and good stability in each of the four stability tests.

EXAMPLE 5.

An aqueous emulsion of an alkyl-modified silicone, referred to as the modified silicone emulsion E hereinafter, was prepared in substantially the same manner as in Example 1 except that the aqueous emulsion of the starting reactants was further admixed with 0.3 g of a 10% by weight aqueous solution of phosphoric acid so that the pH value of the starting emulsion was decreased to 5.2.

The non-volatile matter left after drying of this modified silicone emulsion E at 105° C. for 3 hours was a white solid having a melting point of 37 to 40° C. This solid material was subjected to the analyses by infrared absorption spectrophotometry, nuclear magnetic resonance spectroscopy and gel permeation chromatograph and could be identified from the results of these analyses to be expressed by the formula

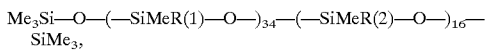

in which Me is a methyl group and R(1) and R(2) each have the same meaning as defined in Example 1. The results of the evaluation tests for this modified silicone emulsion E included an average particle diameter of 230 nm and good stability in each of the four stability tests undertaken.

Comparative Example 1

A reaction mixture was prepared in a glass flask of 500 ml capacity equipped with a stirrer, thermometer and dropping funnel from 122.6 g of the same α-olefin mixture as used in Example 1, 0.04 g of a 0.5% toluene solution of a divinyltetramethyldisiloxane/platinum complex and 150 g of toluene and the reaction mixture was heated to 70° C. under agitation. Thereafter, 27.4 g of the same organohydrogenpolysiloxane as used in Example 1 were added dropwise to the reaction mixture in the flask kept at the above temperature taking 1 hour followed by further continued agitation of the mixture for additional 3 hours at the same temperature to effect the hydrosilation reaction under periodical sampling and analysis of small portions of the reaction mixture by using a 20% aqueous butanol solution of sodium hydroxide to cause alkali decomposition of the remaining silicon-bonded hydrogen atoms with evolution of hydrogen gas. When the reaction had reached completion as indicated by this test without evolution of hydrogen gas, the reaction mixture was subjected to stripping of toluene at 120° C. under reduced pressure to give a white solid material as the reaction product, which is referred to as the modified silicone F hereinafter, having a melting point of 37 to 40° C. and found to be substantially identical with the white solid obtained from the modified silicone emulsion A in Example 1 by drying according to the results of the instrumental analyses.

In the next place, a 100 g portion of the above obtained modified silicone F was introduced into a glass beaker of 500 ml capacity together with 10 g of the same surface active agent as used in Example 1. and they were melted together by heating at 50° C. into a uniform melt by agitation with a homomixer. The silicone melt in the beaker was gradually admixed with 190 g of hot water at 50° C. under agitation to give a base emulsion of the silicone which was passed once through a homogenizer under a pressure of 30 MPa at the same temperature to give a stabilized aqueous emulsion, which is referred to as the modified silicone emulsion G hereinafter.

The average particle diameter of this modified silicone emulsion G was 430 nm. The emulsion was poor in the stability as compared with the modified siliconeemulsions A to E so that the phenomenon of phase separation was noted after 2 months of standing in the storage stability test and the phenomenon of gas floating was noted in each of the stability tests against dilution and mechanical shearing.

Comparative Example 2

A 100 parts by weight portion of the modified silicone emulsion G obtained in Comparative Example 1 was admixed with 3 parts by weight of a 50% aqueous solution of sodium alkyldiphenyl ether sulfonates (Pellex SS-L, a product by Kao Co.) to give another silicone emulsion, referred to as the modified silicone emulsion H hereinafter.

The average particle diameter of this modified silicone emulsion H was 430 nm. The emulsion could pass the storage stability test, stability test against dilution and mechanical stability test-I but the phenomenon of gas floating was noted in the mechanical stability test-II indicating less stability against mechanical shearing than the modified silicone emulsions A to E.

What is claimed is:

1. A method for the preparation of an aqueous emulsion of an organopolysiloxane having long-chain alkyl groups of at least 12 carbon atoms bonded to the silicon atoms, which comprises the steps of:
   (a) dispersing and emulsifying an organohydrogenpolysiloxane having at least one hydrogen atom directly bonded to the silicon atom and an α-olefin compound represented by the general formula $CH_2=CH-C_pH_{2p+1}$, in which the subscript p is a positive integer not smaller than 10, jointly in an aqueous medium containing a surface active agent to give a primary aqueous emulsion;
   (b) admixing the primary aqueous emulsion with a catalytically effective amount of a platinum compound; and
   (c) heating the primary aqueous emulsion under agitation to effect hydrosilation reaction between the silicon-bonded hydrogen atoms in the organohydrogenpolysiloxane and the ethylenically unsaturated bonds in the α-olefin compound.

2. The method for the preparation of an aqueous emulsion of an organopolysiloxane having long-chain alkyl groups as claimed in claim 1 in which the organohydrogenpolysiloxane is represented by the general formula

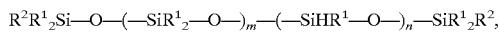
$R^2R^1{}_2Si-O-(-SiR^1{}_2-O-)_m-(-SiHR^1-O-)_n-SiR^1{}_2R^2$,

In which $R^1$ is a monovalent hydrocarbon group having 1 to 6 carbon atoms, $R^2$ is a hydrogen atom or $R^1$ and the subscripts m and n are each 0 or a positive integer not exceeding 1000 with the proviso that, when n is equal to 0, at least one of the two $R^2$ groups is a hydrogen atom.

3. The method for the preparation of an aqueous emulsion of an organopolysiloxane having long-chain alkyl groups as claimed in claim 1 in which the temperature in step (c) is in the range from 50 to 80° C.

4. The method for the preparation of an aqueous emulsion of an organopolysiloxane having long-chain alkyl groups as claimed in claim 1 in which the aqueous emulsion heated in step (c) is admixed with an acidic compound in an amount in the range from 0.01 to 1 part by weight per 100 parts by weight of the organohydrogenpolysiloxane.

5. The method for the preparation of an aqueous emulsion of an organopolysiloxane having long-chain alkyl groups as claimed in claim 2 in which the group denoted by $R^1$ is a methyl group.

6. The method for the preparation of an aqueous emulsion of an organopolysiloxane having long-chain alkyl groups as claimed in claim 2 in which the subscript n is a positive integer in the range from 5 to 100 with the proviso that the ratio n:(m+n) is not smaller than 0.25.

7. The method for the preparation of an aqueous emulsion of an organopolysiloxane having long-chain alkyl groups as claimed in claim 1 in which the amount of the α-olefin compound in step (a) is in the range from 1.0 to 1.5 moles per mole of the silicon-bonded hydrogen atoms in the organohydrogenpolysiloxane.

8. The method for the preparation of an aqueous emulsion of an organopolysiloxane having long-chain alkyl groups as claimed in claim 1 in which the surface active agent in step (a) is a non-ionic surface active agent.

9. The method for the preparation of an aqueous emulsion of an organopolysiloxane having long-chain alkyl groups as claimed in claim 1 in which the platinum compound is chloroplatinic acid or a platinum/vinylsiloxane complex compound.

10. The method for the preparation of an aqueous emulsion of an organopolysiloxane having long-chain alkyl groups as claimed in claim 4 in which the acidic compound is phosphoric acid.

11. The method for the preparation of an aqueous emulsion of an organopolysiloxane having long-chain alkyl groups as claimed in claim 1 in which the amount of the platinum compound added in step (b) is in the range from 1 to 100 ppm by weight, calculated as the platinum element, based on the amount of the organohydrogenpolysiloxane.

* * * * *